United States Patent [19]

Shinohara et al.

[11] Patent Number: 4,694,723
[45] Date of Patent: Sep. 22, 1987

[54] TRAINING TYPE ELECTRONIC MUSICAL INSTRUMENT WITH KEYBOARD INDICATORS

[75] Inventors: Isao Shinohara, Tokorozawa; Itsuro Yoshimoto, Tokyo, both of Japan

[73] Assignee: Casio Computer Co., Ltd., Tokyo, Japan

[21] Appl. No.: 856,697

[22] Filed: Apr. 25, 1986

[30] Foreign Application Priority Data

May 7, 1985 [JP] Japan ................................ 60-96236

[51] Int. Cl.⁴ ...................... G09B 15/04; G10H 1/36; G10H 7/00
[52] U.S. Cl. ...................................... 84/1.03; 84/1.28; 84/478
[58] Field of Search ................... 84/1.01, 1.28, 477 R, 84/478

[56] References Cited

U.S. PATENT DOCUMENTS

4,364,299 12/1982 Nakada et al. .................... 84/478
4,378,720 4/1983 Nakada et al. .................... 84/478 X
4,506,580 3/1985 Koike .............................. 84/478 X Primary Examiner—S. J. Witkowski
Attorney, Agent, or Firm—Frishauf, Holtz, Goodman & Woodward

[57] ABSTRACT

A keyboard type electronic musical instrument in which note data and duration data are read out from a memory in accordance with the progress of a musical piece, and a control circuit (CPU) turns on display devices provided for individual keys on a keyboard in response to note data, thus training a player to operate keys specified by the display devices. The control circuit counts each instance of noncoincidence between a key represented by the note data and an operated key on the keyboard, and obtains deviations between a key operation timing defined by duration data and the timing of key operation on the keyboard. After the end of a performance, the control circuit informs the player of the number of the mis-key operations or the accumulation of key operation timing deviations by means of the display devices. A number of display devices corresponding to the accuracy of the performance are lit.

15 Claims, 19 Drawing Figures

| MARK | NUMBER OF WRONG KEY OPERATIONS |
|---|---|
| 32 | 0 |
| 31 | 1 |
| 30 | 2 |
| 29 | 3 |
| 28 | 4 ~ 5 |
| 27 | 6 ~ 7 |
| 26 | 8 ~ 9 |
| 25 | 10 ~ 12 |
| 24 | 13 ~ 15 |
| 23 | 16 ~ 19 |
| 22 | 20 ~ 23 |
| 21 | 24 ~ 27 |
| 20 | 28 ~ 32 |
| 19 | 33 ~ 37 |
| 18 | 38 ~ 42 |
| 17 | 43 ~ 48 |
| 16 | 49 ~ 54 |
| 15 | 55 ~ 61 |
| 14 | 62 ~ 68 |
| 13 | 69 ~ 75 |
| 12 | 76 ~ 83 |
| 11 | 84 ~ 91 |
| 10 | 92 ~ 99 |
| 9 | 100 ~ 108 |
| 8 | 109 ~ 117 |
| 7 | 118 ~ 127 |
| 6 | 128 ~ 137 |
| 5 | 138 ~ 147 |
| 4 | 148 ~ 158 |
| 3 | 159 ~ 169 |
| 2 | 170 ~ 180 |
| 1 | 181 ~ 192 |

FIG. 13

| MARK | TIMING ERROR (UNIT: T) |
|---|---|
| 32 | 0 |
| 31 | 1 |
| 30 | 2 |
| 29 | 3 |
| 28 | 4 ~ 5 |
| 27 | 6 ~ 7 |
| 26 | 8 ~ 9 |
| 25 | 10 ~ 12 |
| 24 | 13 ~ 15 |
| 23 | 16 ~ 19 |
| 22 | 20 ~ 23 |
| 21 | 24 ~ 27 |
| 20 | 28 ~ 32 |
| 19 | 33 ~ 37 |
| 18 | 38 ~ 42 |
| 17 | 43 ~ 48 |
| 16 | 49 ~ 54 |
| 15 | 55 ~ 61 |
| 14 | 62 ~ 68 |
| 13 | 69 ~ 75 |
| 12 | 76 ~ 83 |
| 11 | 84 ~ 91 |
| 10 | 92 ~ 99 |
| 9 | 100 ~ 108 |
| 8 | 109 ~ 117 |
| 7 | 118 ~ 127 |
| 6 | 128 ~ 137 |
| 5 | 138 ~ 147 |
| 4 | 148 ~ 158 |
| 3 | 159 ~ 169 |
| 2 | 170 ~ 180 |
| 1 | 181 ~ 192 |

$T = \frac{1}{96}$ NOTE DURATION

4,694,723

TRAINING TYPE ELECTRONIC MUSICAL INSTRUMENT WITH KEYBOARD INDICATORS

BACKGROUND OF THE INVENTION

This invention relates to an electronic musical instrument having a so-called navigate or training function, in which a player is guided to operate keys in accordance with display elements provided for individual keys.

These are electronic musical instruments, having such a navigate training function, in which display elements, e.g., LEDs (light-emitting diodes), are provided for individual keys on a keyboard to guide a music performance. With these musical instruments, for the purpose of performance practice, a player operates keys while being guided by the display elements which are successively turned on with the progress of a musical piece being played.

Also, there are electronic musical instruments adapted for playing practice, in which the accuracy of operations of keys which are operated while listening to an automatically played musical piece, is decided so that the result of practice is digitally displayed as a mark.

The latter electronic musical instrument does not have a melody guide function. Therefore, it is usual for beginners to operate keys at wrong timings deviated by one bar or two bars and also frequently operate erroneous keys. Such performance is given a very bad score, so that the beginner will lose confidence.

With the former electronic musical instrument the performance skill progresses quickly by virtue of the melody guide function, but is is impossible to know the extent of progress in performance.

SUMMARY OF THE INVENTION

An object of the invention is to provide a keyboard type electronic musical instrument, which has an improved function of keyboard playing practice for trainees.

Another object of the invention is to provide an electronic musical instrument, which permits effective training according to the degree of skill of players.

The invention features the following.

(1) Normal note data and operated key data are compared to detect their non-coincidence, and times of occurrence of non-coincidence are counted to display data corresponding to the count.

(2) Data representing either the count of times of occurrence of non-coincidence between normal note data and operated key data or the accumulation of deviations between normal duration data and actual performance duration data is displayed.

(3) In a performance after a given part of the music being performed, when keys are operated accurately or with considerably accurate durations, a corresponding value is subtracted from the result of the accumulation, and data corresponding to the subtraction result is displayed.

BRIEF DESCRIPTION OF THE DRAWING

FIG. 4 formed by FIGS. 4A, 4B, is a flow chart in a guide mode I, and FIG. 4C forms a part of FIG. 4A;

FIG. 5 including FIGS. 5A, 5B and 5C, is a flow chart in a guide mode II;

DESCRIPTION OF THE PREFERRED EMBODIMENTS

Figure 1:
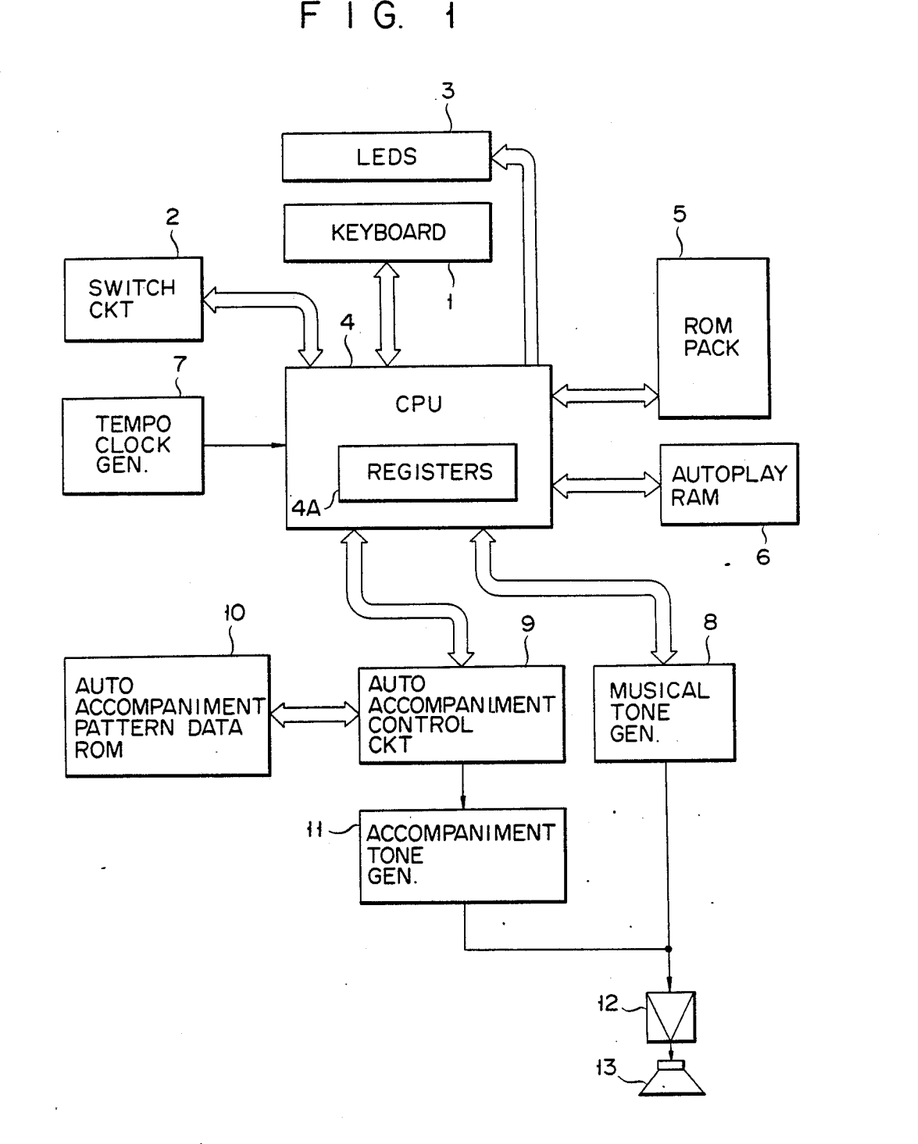
FIG. 1 is a block diagram of an embodiment of the invention.
Figure 3:
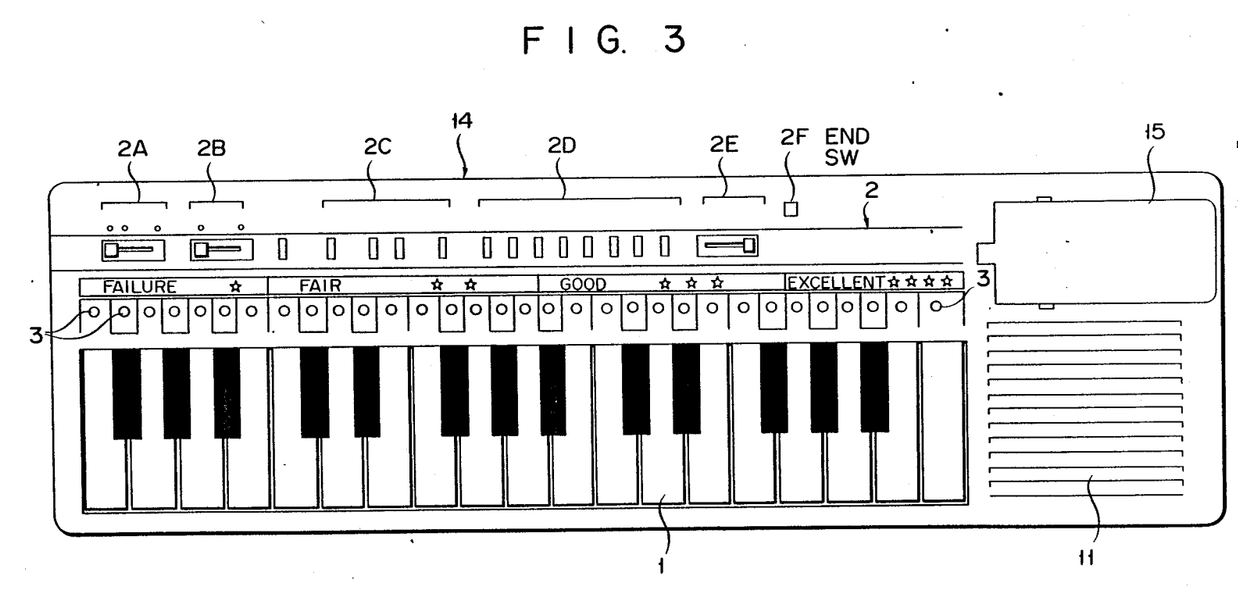
FIG. 3 shows an arrangement of a keyboard, and switches.

Now, an embodiment of the invention will be described with reference to the drawings. Referring to FIG. 1, a keyboard 1 has as shown in FIG. 3, 32 keys from notes F1 to C4. Key operation signals are fed to CPU 4. As shown in FIG. 3, a switch input section 2 includes mode switches 2A for selecting one of three modes, i.e., a power-off mode, a normal play mode and a navigate or training play mode for playing the keyboard in conformity to LEDs which are lit. The switch input section 2 also includes guide select switches 2B for determining the kind of guide (melody guide I or II) depending on whether an automatic accompaniment follows key operations in the navigate training play mode or not. The switch input section 2 further includes rhythm select switches 2C, timbre select switches 2D, volume control knob 2E and an END switch for stopping the training play mode. The outputs of these switches are fed to CPU 4. LEDs 3 are provided for the respective keys. The musical data of a musical piece stored in a ROM pack 5 is read out into an automatic play RAM 6 for the preparation of automatic play of the musical piece. During the automatic play LEDs for keys corresponding to notes being played are successively turned on. The player operates keys for training under the guide of LEDs 3. A timer (TC) 7 comprises a clock pulse generator for generating a clock pulse signal, one cycle period of which defines the minimum unit time of musical performance. For instance, one cycle of the clock pulse corresponds to ¼ of 1/96 note duration. The clock frequency of the timer is set by a tempo switch (not shown), and the timer clock output is fed to CPU 4.

Key operation signals from keyboard 1 or data read out from RAM 6 are fed to musical tone signal generator 8 to generate musical tone signals. These tone signals are sounded through amplifier 12 and loudspeaker 13. It should be noted that, in the training play mode, data from RAM 6 are used only for turning on LEDs 3.

A plurality of accompaniment pattern data are stored in an auto-accompaniment pattern data ROM 10, and they are selected by switches in switch input section 2. The selected pattern data is read out under control of CPU 4 to auto-accompaniment control circuit 9. The data is then fed to auto-accompaniment tone generator 11 to generate auto-accompaniment tone signals which are sounded through amplifier 12 and loudspeaker 13.

As will be described later, in a performance practiced under the melody guide made I or II, LEDs 3 corresponding in number to the accuracy of performance are lit to mark the performance of the trainee.

In the melody guide mode I the auto-accompaniment follows the key operation, but in the melody guide mode II it does not follow the key operation but proceeds in synchronism to the read-out of the musical data from RAM 6.

Figure 2:
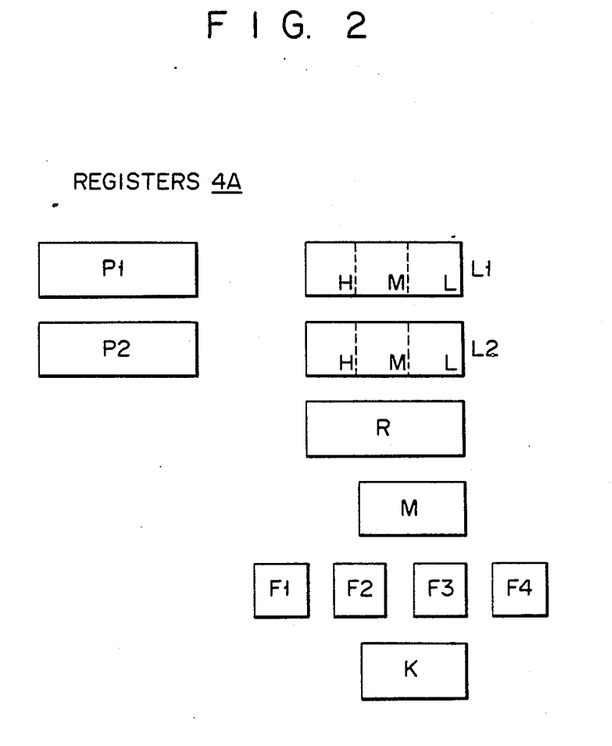
FIG. 2 is a schematic view showing various registers.

Now, the construction of register section 4A in CPU 4 will be described with reference to FIG. 2. Registers P1 and P2 are loaded with note data. Registers L1 and L2 are loaded with duration data. These note and duration data are read out from ROM pack 5 into RAM 6. Register 6 is a reaction speed register for accumulating a time difference between a correct key depression timing defined by duration data from ROM pack 5, and an actual key depression timing. Register M is incremented by 1 when a key is depressed, which is not specified by note data from ROM pack 5. In other words, the number of mis-operated keys is accumulated. Registers F1 to F4 are flag registers. Delayed depression flags 1 and 2 are set in registers F1 and F2. An early depression flag is set in register F3. "1" is set in register F4 when data in register L2 becomes negative. Register K is a counter for counting notes successively read out from RAM 6. As is shown, registers L1 and L2 each consist of a high order (H) section, a middle order (M) section and a low order (L) section are, these sections each comprised of 4 bits. For the calculation of marks, data of the lower order (L) section are neglected as minute data.

Now, the appearance of musical instrument body 14 will be described with reference to FIG. 3. As noted above, keyboard 1 has 32 keys of notes F1 to C4 and LEDs 3 are provided for the respective keys. To indicate the accuracy of performance on the basis of the number of LEDs 3 which are lit, a word "FAILURE" and one star mark are represented for seven low-pitch tone-side LEDs 3, a word "FAIR" and two star marks are represented for the next ten LEDs, a word "GOOD" and three star marks are represented for the next nine LEDs, and a word "EXCELLENT" and four star marks are represented for the next six LEDs. These 32 LEDs are turned on in increasing number from the low-pitch tone side with increasing accuracy of performance. Casing 15 accommodating ROM pack 5 is provided at the upper portion of loudspeaker 11, so that the ROM pack can be freely loaded into casing 15.

Figures 4, 4A:
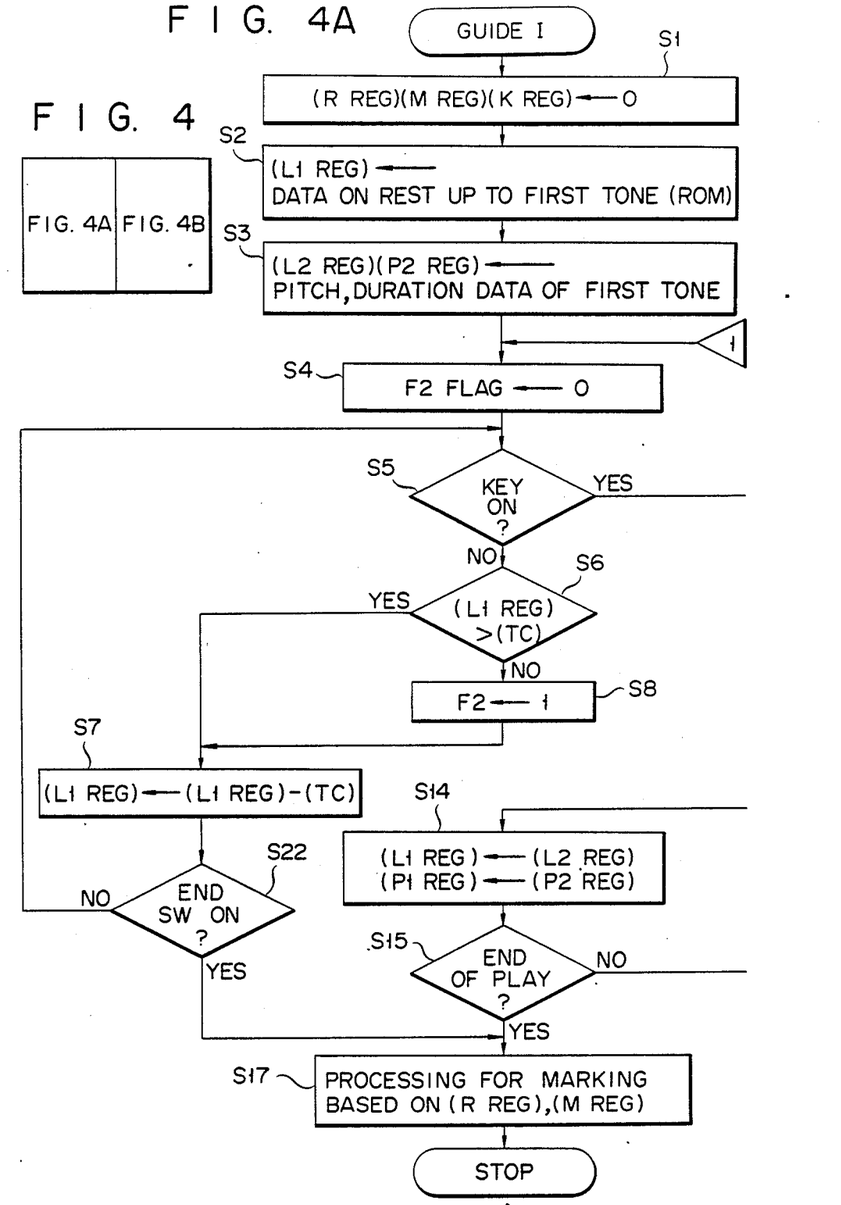
Figures 5, 5A:
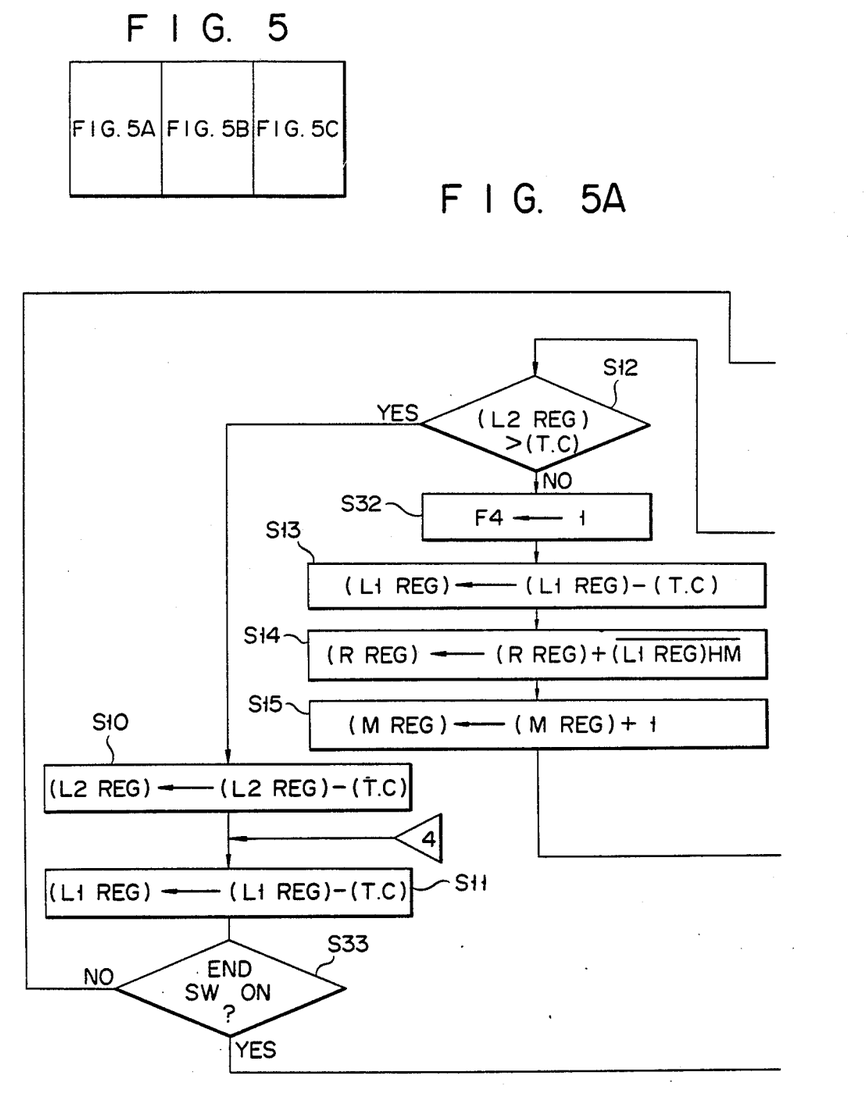
Figure 10:
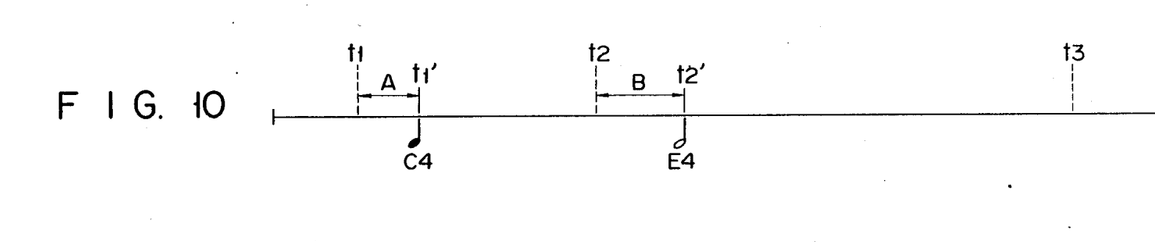
Figure 11:
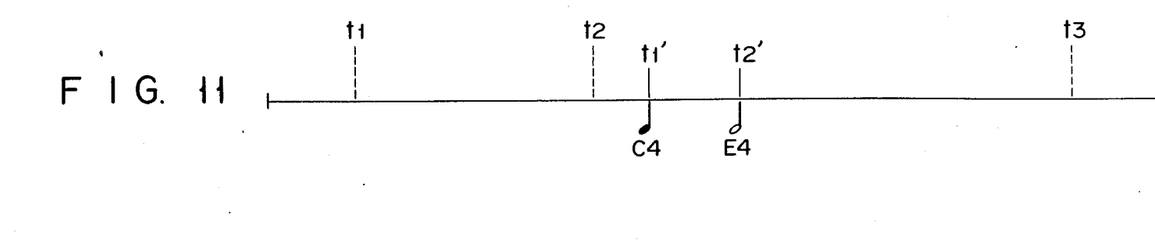
Figure 12:
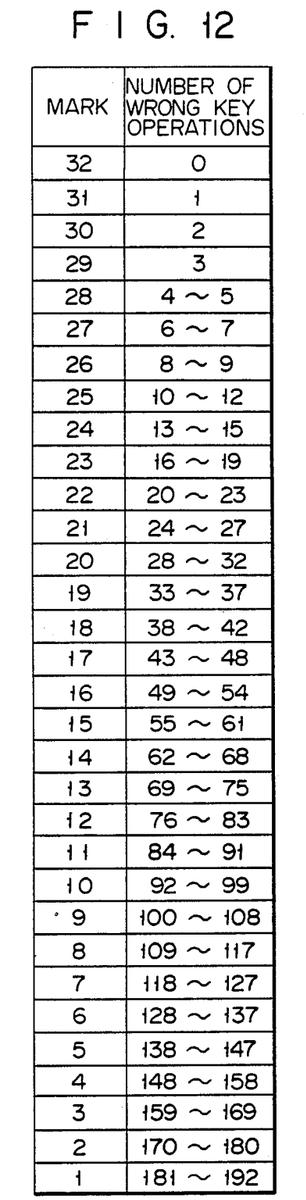
FIG. 12 shows a relation between erroneous operated key numbers and marks.
Figure 13:
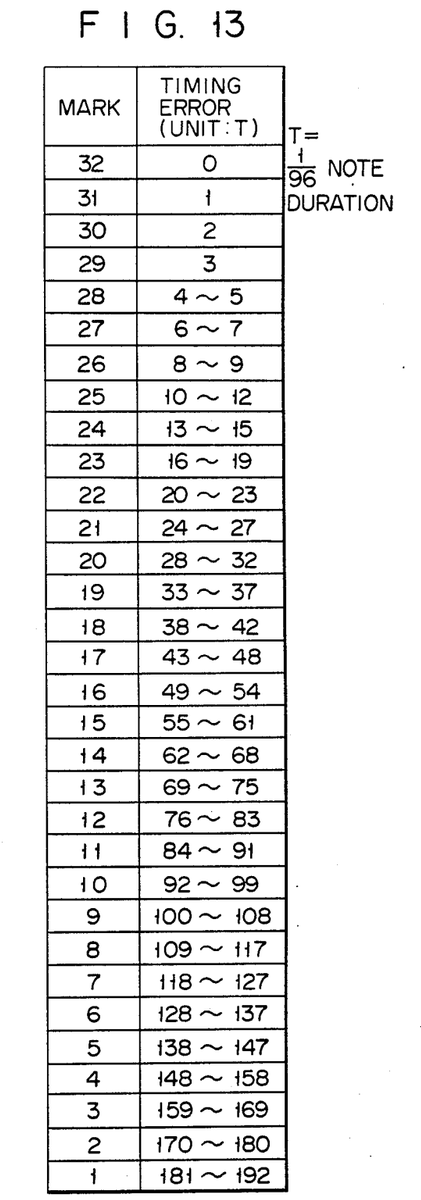
FIG. 13 shows a relation between key operation timing deviations and marks.

The operation of the embodiment will now be described with reference to the flow charts of FIGS. 4 and 5, exemplary scores shown in FIGS. 6 to 11 and mark tables shown in FIGS. 12 and 13. The flow chart of FIG. 4 shows an example of operation in the melody guide mode I where an auto-accompaniment follows the key operation. The flow chart of FIG. 5 shows an example of operation in the melody guide mode II where the autoaccompaniment does not follow the key operation but proceeds at a speed specified by tempo clock generator 7.

Figure 6:
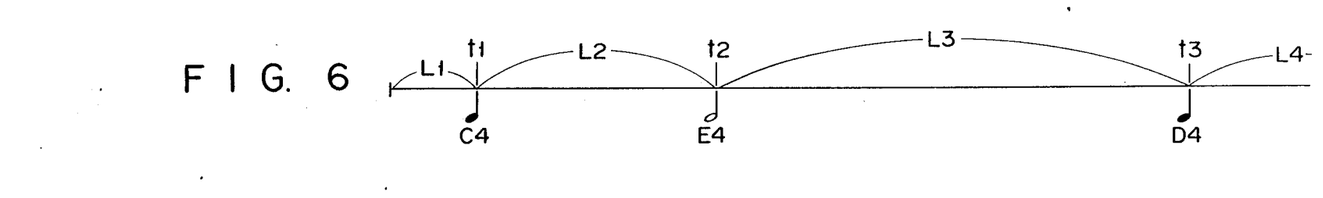
FIGS. 6 to 11 show scores based on exemplary performances.
Figure 7:
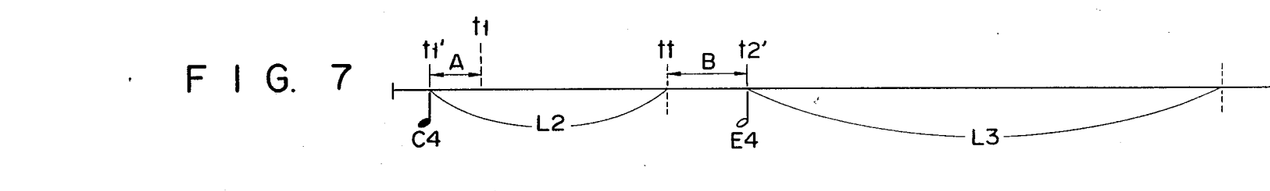

The score shown in FIG. 6 is to be performed correctly and stored in ROM pack 5. FIG. 7 shows an actual performance which was carried out on the keyboard in the guide mode I, and FIGS. 8 to 11 show actual performances which were played on the keyboard in guide mode II. In FIG. 6, L1 indicates duration data (which is read out from ROM pack 5) representing a time length up to a time when the first tone (note C4, duration L2 of a quarter tone) is sounded. t1 is a timing at which the key corresponding to the first tone is to be operated, t2 a timing of operation of the key corresponding to the second tone (note E4 and duration L3 of a half tone), and t3 a timing of operation of the key corresponding to the third tone (note D4 and duration L4 of a quarter tone).

First, the play pattern of FIG. 7 will be described.

Figure 4B:
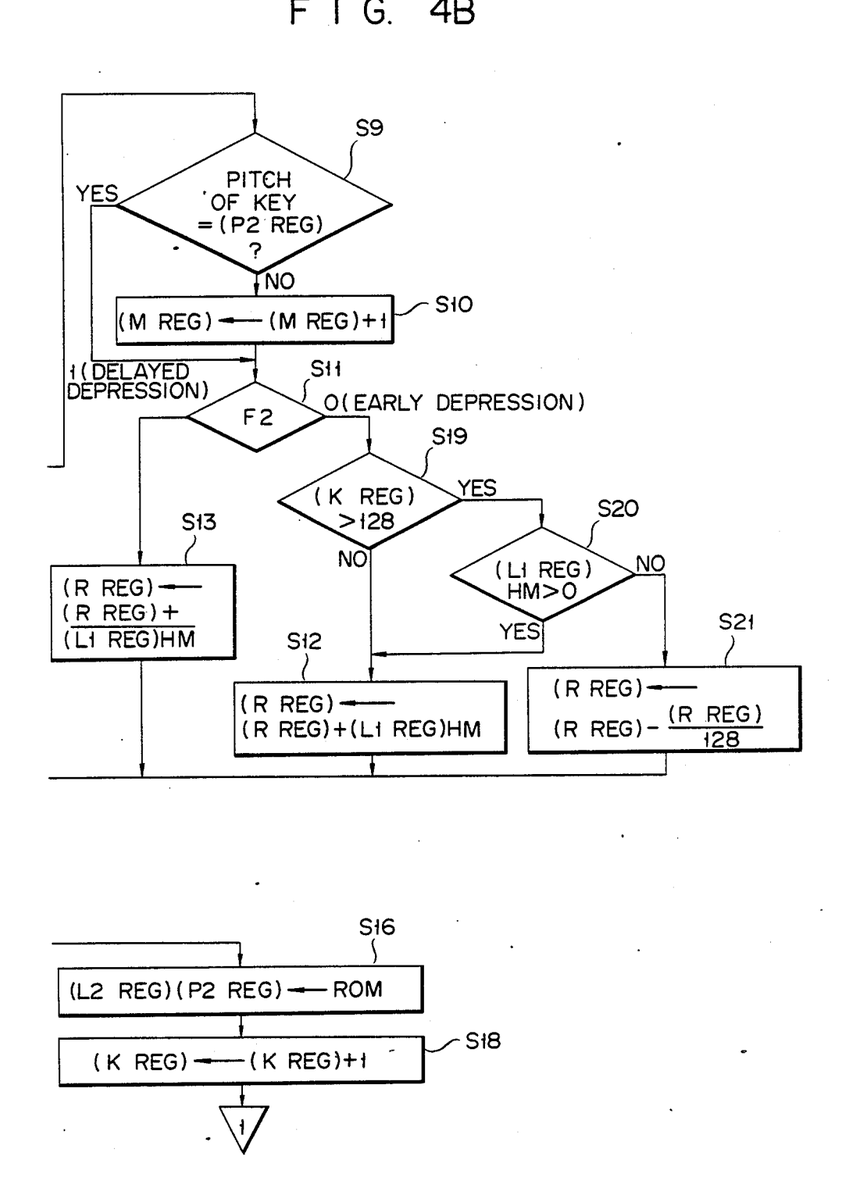
Figure 4C:
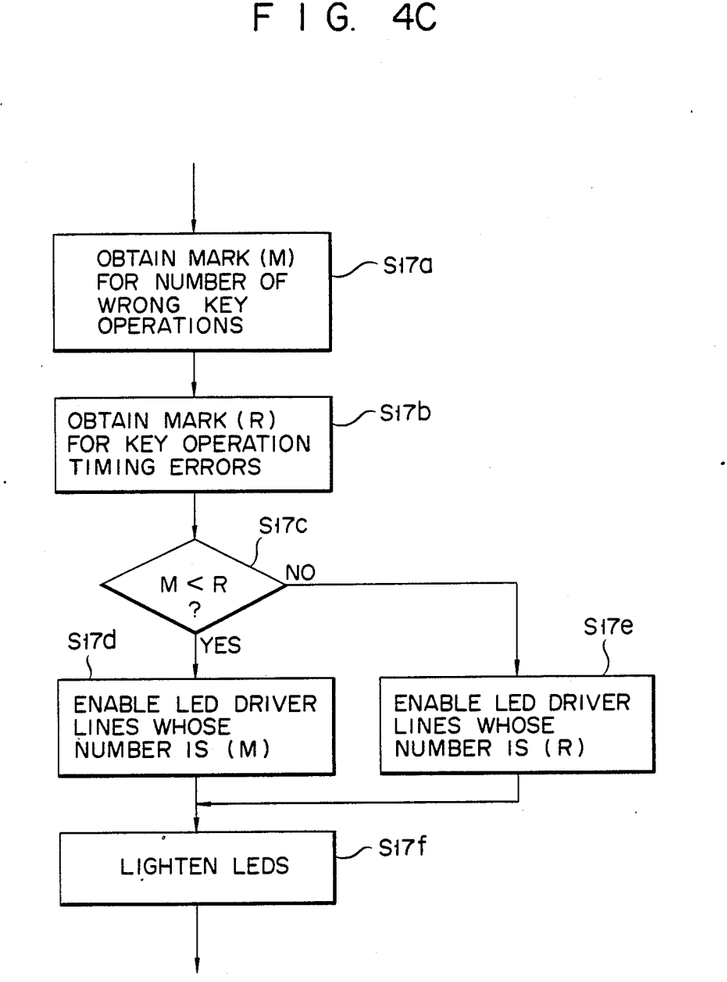

First, the training play mode is selected in the mode switch section 2A, and then the guide mode I is designated in the guide select switch section 2B. Also, to designate the music shown in FIG. 6, musical piece data are read out from ROM pack 5 to be transferred through CPU 4 to RAM 6. The selection of a musical piece in ROM pack 5 is done by operating a key in the keyboard. As a result, the routine of the flow chart of FIGS. 4A–4C is started. In step S1 of FIG. 4A, registers R, M and K are cleared. In subsequent step S2, duration data L1 representing duration up to the time when the first tone (C4) is sounded is set in L1 register. In subsequent step S3, duration data L2 and note data C4 of the first tone are set in registers L2 and P2. In subsequent step S4, flag register F2 is cleared. In step S5 a check is done as to whether a key is on. In step S6, the data in register L1 and the shortest unit time (TC) specified by timer (TC) 7 are compared in magnitude. At this moment, L1>TC, so that the routine goes to step S7, in which one-bit data (TC) representing the shortest unit time specified by timer 7 is subtracted from the data in register L1 and the result is set in register L1.

The routine then goes to step S22, in which a check is done as to whether end switch 2F is "on" (indicating the termination of the training mode). Since the result is NO, the routine goes back to step S5. The above steps S5, S6, S7 and S22 are repeatedly executed until the key of the first tone is operated at time t'1 earlier than a predetermined time t1.

When the key for the first tone (C4) is depressed at instant t1' earlier by a time interval A than the normal timing t1, the routine goes from step S5 to step S9. In step S9 (FIG. 4B), a check is done as to whether the key data signal produced coincides with note data C4 in register P2, i.e., whether the correct key has been depressed. Since in this case the correct key has been depressed, the routine proceeds to step S11. If a wrong key has been operated, the routine goes to step S10, in which register M is incremented by 1. The routine then goes to step S11. When the key is depressed at t'1, a tone corresponding to this key is sounded, and an accompaniment tone is sounded in synchronism with the key depression.

In step S11 it is detected that data in flag register F2 is "0" (indicating that the key is depressed earlier), and the routine goes to step S19. In step S19 a check is done as to whether data in register K represents a number greater than a predetermined number, i.e., 128, i.e., whether over 128 note data has been read out from RAM 6. At this moment, the result is NO, so that the routine goes to step S12. In step S12, data A of upper order bits (H, M) in register L1 is added to data in register R, and the result constitutes data (A) in register R. Data of lower order bits (L) of register L, representing duration shorter than 1/96 note duration is neglected.

The routine then proceeds to step S14, in which data of duration L2 in register L2 is set in register L1, and data of note C4 in register P2 is set in register P1. When it is detected in step S15 that the musical piece has not yet been completed, step S16 is executed, in which data of duration L3 (a half tone) and note E4 are loaded into registers L2 and P2 from RAM 6. In subsequent step S18, register K is incremented by 1 to represent the read-out of the second tone data. The routine then returns to step S4.

Steps S5 to S7 and S22 are repeatedly executed until the time tt, determined by duration data L2, arrives. At the time tt, the data in register L1 becomes negative in step S7. Therefore, in subsequent step S6 executed after steps S22 and S5 the result of decision is NO. The routine thus proceeds to step S8, in which 1 is set to flag register F2, representing that a key has been depressed later. Then, steps S7, S22 and S5 are executed. Then, steps S5 to S7 and S22 are executed until the key for the second one is depressed at late instant t2'. During this time interval, data in register L1 increases in the negative direction through the calculation in step S7 and approaches −B till a point of time t2'.

When the key for the second tone is depressed at time t2' later by duration B than time tt, the routine goes through steps S5, S9 and S11. Since the F2 flag is "1" (indicating that the key is depressed later), the routine goes to step S13, in which the complement (negative value) B of data in L1 register is added to data in R register so that data A+B is obtained, which represents the extent of delayed depression of keys, that is, the degree of reaction speed of the trainee. In step S14, data L3 is set in register L1 and data E4 in register P1. In subsequent step S16 data L4 (quater tone) is set in register L2, and data D4 is loaded in register P2. Further, in step S18 the data in register K becomes "2", and the routine goes back to step S4. The operation for the third and following tones is performed similarly.

If it is determined in step S19 that data in register K indicates 128 or above, the long performance made so far with 128 notes or more is considered in marking the result of performance made by the trainee as described later.

If a key is depressed earlier by a time period equal to or shorter than 1/96 note duration, it is detected in step S20, and the routine then proceeds to step S21, in which data of register R divided by 128 is subtracted from the value accumulated in register R to give a premium to the mark.

When the end of musical data is detected on the basis of an END mark in the data in step S15, step S17 is executed, in which a processing for notifying the result of training to the performer is done. More specifically, referring to FIG. 4C, in steps S17a and S17b the mark (M) representing the number of erroneous key operations and the mark (R) representing key operation timing errors are obtained from erroneous key operation data in register M and timing error data in register R from the mark tables shown in FIGS. 12 and 13. As shown in FIG. 4C, in step S17c, the marks (M) and (R) are compared. If (M)<(R), step S17d is executed, in which LED driver lines are enabled according to the erroneous key operation mark (M) which is smaller than the timing error mark (R). When (R)<(M), in step S17e LED driven lines are enabled in accordance with the mark (R) for key operation timing error. In step S17f, LEDs are lit which correspond in number to the smaller one of the erroneous key operation mark and timing error mark. The full mark of the result of practice is set to 32 points.

The operation in the melody guide mode II will now be described with reference to the flow chart of FIG. 5. In this mode, auto-accompaniment proceeds in synchronism to the read-out of musical data from RAM 6 irrespective of the key operation.

Figure 8:
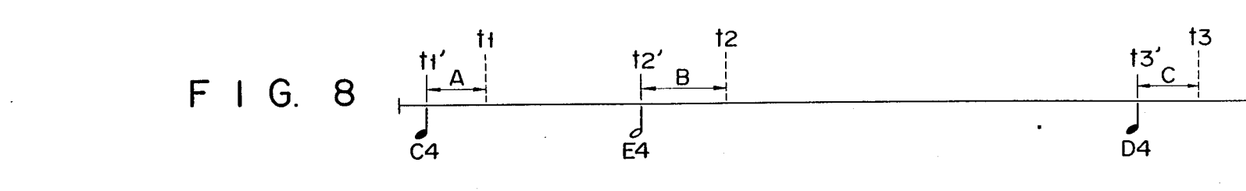

In the example of key operations in the performance pattern shown in FIG. 8, all the keys are operated earlier than normal timings t1, t2 and t3. In the melody guide mode II, the auto-accompaniment tones are sounded at normal timings t1, t2 and t3.

Figure 5B:
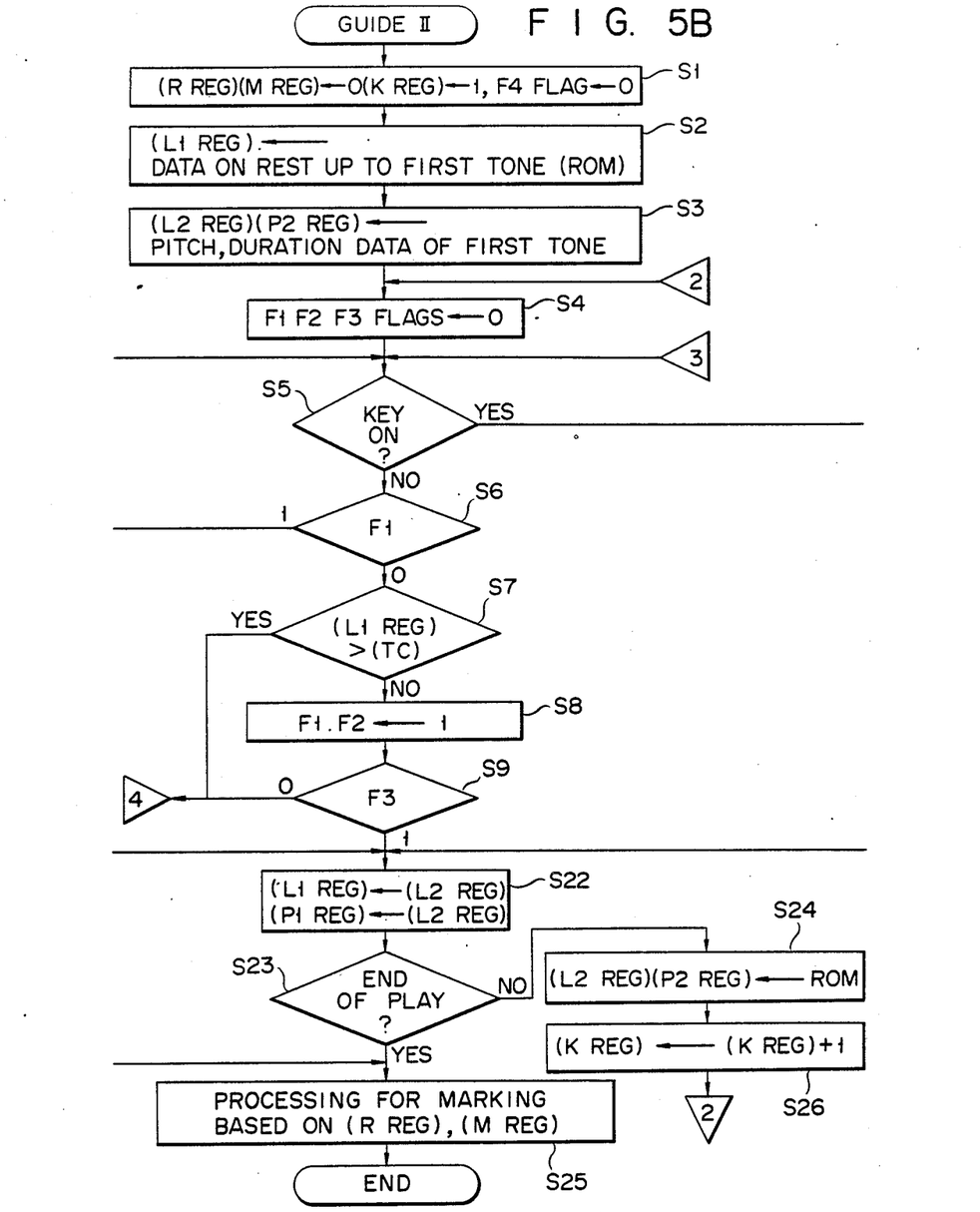

The operation performed until a key is operated at time t1' earlier than the normal timing t1, is the same as that shown in FIG. 7. That is, steps S1 to S7 (FIG. 5B), S11 and S33 (FIG. 5A) are executed, and then steps S5, S11 and S33 are repeated. In the mode II, flag F4 is cleared in step S1. In step S4, flags F1, F2 and F3 are cleared. Data L1 is loaded in register L1, data L2 in register L2, and data C4 is loaded in register P2.

When the key of C4 is depressed at time t1', steps S5, S16 (FIG. 5C), S18, S27, S20 (here data in register R becomes A) and S21 (here earlier depression flag F3 is set to "1") are executed, and the routine returns to step S5. Steps S5, S6, S7, S11 and S33 are repeated until time t1 arrives. When data in register L1 becomes negative in step S11, the routine goes from step S5 through steps S6, S7, S8 (here data "1" is set to flag registers F1 and F2), steps S9, S22 (here data L2 and C4 are loaded in registers L1 and P1), steps S23, S24 (here data L3 representing a half tone duration and data E4 are loaded in respective registers L2 and P2), and S26 (here data in register K becomes 2), and the routine then goes back to step S4. The flags in flag registers F1, F2 and F3 are thus reset.

Figure 5C:
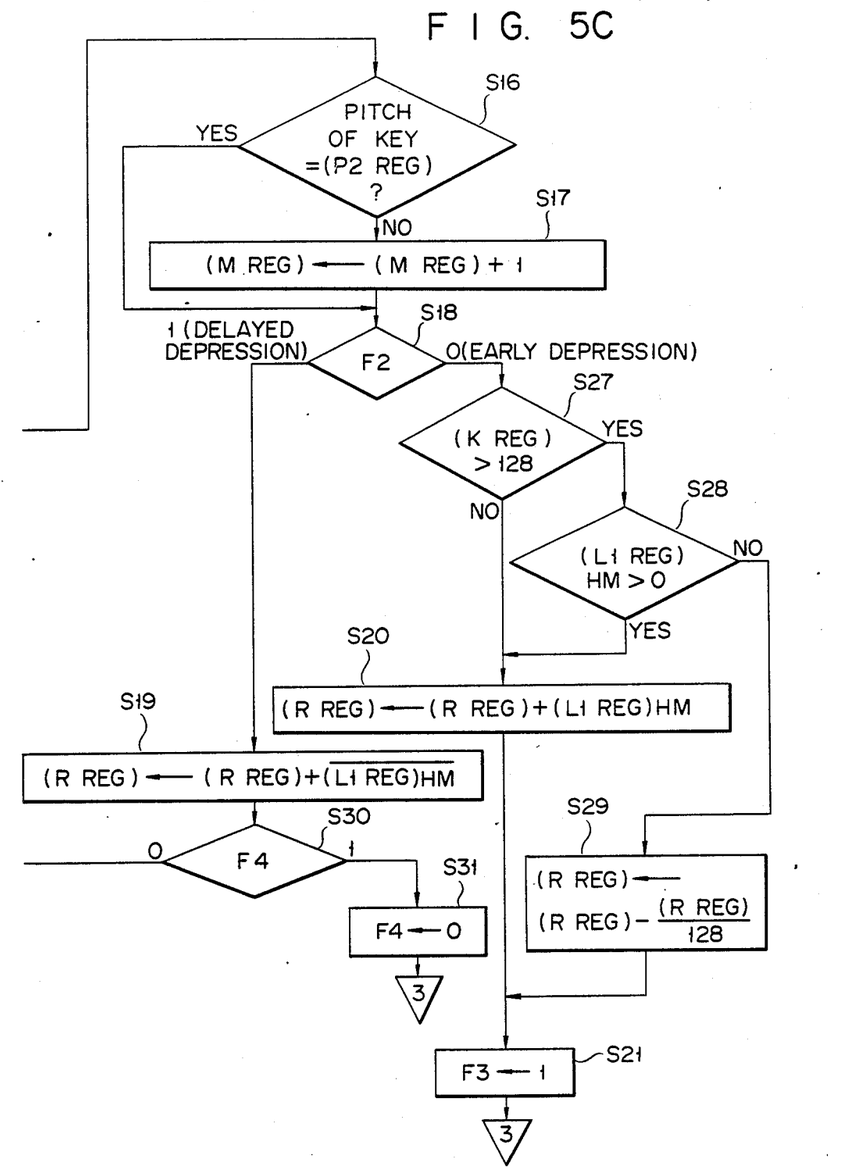

In the guide mode II, the loading of melody data from RAM 6 into CPU 4 is determined by rest duration data loaded from RAM 6 into register L1. Therefore, after data A in register L1 has been added to data in register R at time t1', it is necessary to wait the loading of the next data for a time period of A. Therefore, after setting "1" to flag register F3 in step S21, the routine returns to step S5.

While the time interval L2 passes until time t2', steps S5 to S7, S11, S33 and S5 are repeated. When the key for the second tone E4 is subsequently depressed at time t2' earlier than instant t2, the routine also goes from step S5 through steps S16, S18, S27, S20 (data in register R becomes A+B) and S21, and the routine then goes back to step S5. Similar operation then is executed with respect to the key for the third tone D4.

Figure 9:
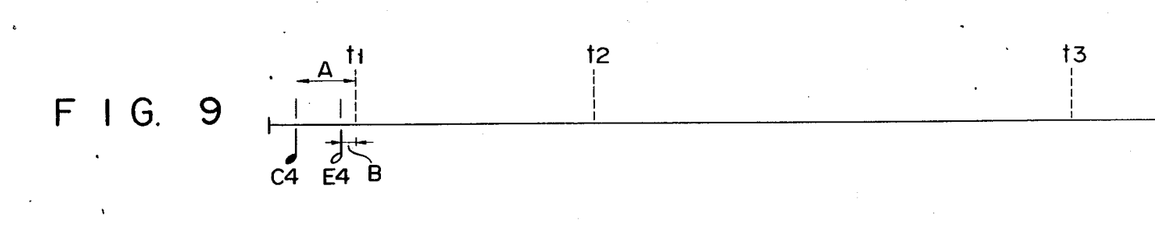

Now, the example of FIG. 9 will be described. In this example, the first key C4 and second key E4 are both depressed earlier than the normal timing t1.

What takes place until the first key C4 is depressed is the same as in the case of FIG. 8. When the second key E4 is depressed at a time earlier by B than time t1, the routine goes from step S5 to step S16. Since the data in register P2 represents noted C4 now, the routine goes to step S17 in which data in register M becomes "1" indicating an occurrence of erroneous key depression. Then, steps S18, S27, S20 (here data in register R becomes B), S21 (here flag F3 is "1"), S5 to S7, S11, S33 and S5 are executed.

Subsequently at time t1, steps S5 to S8 (here data in flag registers F1 and F2 become "1"), S9, S22, S23, S24 (here note E4 and half tone duration of the second tone are read out from RAM 6) and S26 are executed, and the routine goes back to step S4.

The example of FIG. 10 will now be described. In this example, the depression of the first key C4 is done after a delay of time t1', and the second key E4 after a delay of t2'.

Until time t1, steps S1 to S7, S11 and S33 are repeated. Until the data in register L1 becomes negative at time t1 and the first key C4 is depressed at time t1', the routine goes through steps S5, S6, S7, S8 (here data in flag registers F1 and F2 is "1"), S9, S11, S33 and S5, and then steps S5, S6, S12, S10, S11, S33 and S5 are repeated.

When the key C4 is depressed at time t1', steps S5, S16, S18, S19 (here data in register R becomes A), S30, S22, S23, S24, S26 are executed, and the routine goes back to step S4.

Subsequent operation performed until the second key E4 is depressed at time t2' is the same as the operation until the first key C4 is depressed at time t1'.

When the second key E4 is depressed at time t2', steps S5, S16, S18, S19 (here data in register R becomes A+B), S30, S22, S23, S24 and S26 are executed, and the routine goes back to step S4.

The example of FIG. 11 will now be described. In this example, the first key C4 and second key E4 are both depressed after delay from the normal timing t2. Steps S1 to S7, S11, S33 and S5 are repeated up to time t1.

When time t1 comes, steps S5 to S9 (flags F1 and F2 become "1" during these steps). S11, S33, S5, S6, S12, S10, S11, S3 and S5 are executed. Now, the data in register L1 is negative, so that steps S5, S6, S12, S10, S11, S33 and S5 are repeated.

After time t2, the routine proceeds through steps S5, S6 and S12, Then since the data in L2 register is negative the routine proceeds through step S32 (here flag register F4 is set to "1"), S13 (here data in register L1 is negative) and S14 (here the negative data in register L1, i.e., duration L2 between times t1 and t2 is added to R register). Then, in step S15 register M is incremented by 1 to count an erroneous key depression. Then, step S22 (here data L2 and C4 are set in respective registers L1 and P1), S23, S24 (here data E4 and L3 are set in respective registers L2 and P2) and S25 (here data in register K is "2") are executed, and the routine goes back to step S4.

Then the routine goes through steps S5, S6 and S7. Since the data in register L1 now is substantially 0, NO is yielded, so that steps S8 (here flag F1 and F2 are set to 1), step S9, S11, S33 and S5 are executed. Until t1' comes, steps S5, S6, S12, S10, S11, S33 and S5 are repeatedly executed.

When the key C1 is depressed at time t1', the routine proceeds through steps S5 and S16 to step S17. Since data in register P2 is E4, it is determined that the key has been operated erroneously. The data in register M is incremented by 1 to "2". In step S18 it is detected that data in flag register F2 is "1" (indicative of delayed depression), and the routine proceeds to step S19, in which data representing duration between times t2 and t1' is added to data in register R. It is detected in step S30 that flag F4 is "1", so that step S31 is executed, in which flag F is cleared. The routine then is returned to step S5.

Until time t2' comes the steps S5, S6, S12, S10, S11, S33 and S5 are repeated. When the second key E4 is depressed at t2', steps S5, S16, S18 (data in register P2 is E4), S19 (here data representing duration between times t2 and t2' is added to data in register R), S30 (here flag F4 is "0"), S22, S23, S24 and S26 are executed, and the routine goes back to step S4. Then operation with respect to the third key D4 is performed similarly.

In this embodiment, the mark of the result of performance is displayed using display elements provided for the respective keys. Therefore, there is no need of providing an exclusive score display device, and the panel surface can be effectively uitilized.

What is claimed is:

1. A keyboard type electronic musical instrument, comprising:
   keyboard means including a plurality of keys with respective allotted musical notes, and display elements each provided for a different one of said keys;
   memory means for storing note data and duration data forming a musical piece in accordance with a progression of the musical piece;
   musical tone signal generating means for generating a musical note signal with a tone determined by an operated key of said keyboard means;
   indicating means connected to receive the note data and duration data from said memory means for lighting, in response to the note data, a corresponding display element in said keyboard means to indicate a key to be operated;
   comparing means for comparing the note data successively read out from said memory means and key code signals generated by said keyboard means and representing notes of keys successively operated;
   counting means coupled to said comparing means for counting instances of non-coincidence between a key specified by the note data and a key operated on said keyboard means; and
   display means for displaying a number result of the instances of the non-coincidence between the note data and the operated keys.

2. The electronic musical instrument according to claim 1, wherein said display means displays the number result by said display elements provided for said keys.

3. The electronic musical instrument according to claim 2, wherein said display means lights display elements corresponding in number to the instances of non-coincidence between the operated keys and note data.

4. The electronic musical instrument according to claim 2, wherein said display means lights display elements corresponding in number to the instances of non-coincidence between the operated key and the note data, or the accumulated deviation of key operation timing.

5. A keyboard type electronic musical instrument, comprising:
   keyboard means including a plurality of keys with respective allotted musical notes and display elements each provided for a different one of said keys;
   memory means for storing note data and duration data forming a musical piece in accordance with a progression of the musical piece;
   musical tone signal generating means for generating a musical note signal of a tone determined by an operated key of said keyboard means;
   indicating means connected to receive the note data and duration data from said memory means for lighting, in response to the note data, a corresponding display element in said keyboard means to indicate a key to be operated;
   comparing means for comparing the note data successively read out from said memory means and key code signals generated by said keyboard means and representing notes of keys successively operated;
   counting means coupled to said comparing means for counting instances of noncoincidence between a key specified by the note data and a key operated on said keyboard means;
   detecting means for detecing a deviation between a normal key operation timing defined by the duration data from said memory means and an actual timing of key operation on said keyboard means;

accumulating means for accumulating the deviation detected by said detecting means with respect to each key operation; and display means for displaying a selected one of a result of comparison between the note data and the operated key, and an accumulated deviation of key operation timing.

6. The electronic musical instrument according to claim 5, wherein said display means includes means for displaying either the comparison result representing the non-coincidence between the operated key and the note data or the accumulated deviation of key operation timing on said display elements provided for said keys on said keyboard means.

7. The electronic musical instrument according to claim 5, wherein said display means is arranged to display a graded score of the instances of noncoincidence between the operated key and the note data, and the accumulated deviation of key operation timing deviations.

8. The electronic musical instrument according to claim 5, wherein said comparing means includes first register means and second register means into which the note data and duration data from said memory means are respectively loaded, said second register means being decremented by an externally applied tempo clock signal; and said accumulating means includes third register means connected to receive data in said second register means when a key is operated on said keyboard means for accumulating the deviation between the normal key operation timing and the timing of key operation on said keyboard means.

9. The electronic musical instrument according to claim 8, wherein data in said second register means is added to data in said third register means when the timing of key operation is earlier than the normal key operation timing, and the complement to data in said second register means is added to data in said third register means when the timing of key operation is delayed from the normal key operation timing, so that the deviation between the normal key operation timing and the timing of key operation on said keyboard is accumulated.

10. The electronic musical instrument according to claim 8, wherein the note data and duration data of a next tone are loaded from said memory means into said first and second register means in response to a key operation on said keyboard means.

11. A keyboard type electronic musical instrument, comprising:

keyboard means including a plurality of keys with respective allotted musical notes, and display elements each provided for a different one of said keys;

memory means for storing note data and duration data forming a musical piece in accordance with a progression of the musical piece;

musical tone signal generating means for generating a musical note signal with a tone determined by an operated key of said keyboard means;

indicating means connected to receive the note data and duration data from said memory means to light, in response to the note data, a corresponding display element in said keyboard means to indicate a key to be operated;

comparing means for comparing the note data successively read out from said memory means and key code signals generated by said keyboard means and representing notes of keys successively operated;

counting means coupled to said comparing means for counting instances of noncoincidence between a key specified by the note data and a key operated on said keyboard means;

detecting means for detecting a deviation between a normal key operation timing defined by the duration data from said memory means and an actual timing of key operation on said keyboard means;

accumulating means for accumulating the deviation detected by said detecting means for each key operation;

subtracting means for subtracting, when a key operation timing deviation is smaller than a predetermined value after a predetermined number of data read out from said memory means is exceeded, a value proportionate to the accumulation of the key timing deviation from the deviation accumulated by paid accumulating means, and display means for displaying a selected one of the counted instances of noncoincidence between the operated key and the note data, and the accumulation value of the deviation of key operation timing.

12. The electronic musical instrument according to claim 11, wherein said display means includes means for displaying either the comparison result representing the noncoincidence between the operated key and the note data or the accumulated deviation of key operation timing on said display elements provided for said keys on said keyboard means.

13. The electronic musical instrument according to claim 11, wherein said display means lights display elements corresponding in number to the instances of non-coincidence between the operated key and the note data, or the accumulated deviation of key operation timing.

14. The electronic musical instrument according to claim 11, wherein said display means is arranged to display a graded score of the instances of coincidence between the operated key and the note data, and the accumulated deviation of key operation timing.

15. The electronic musical instrument according to claim 11, wherein said subtracting means includes means for dividing the deviation accumulated by said accumulating means by a predetermined value to obtain said value proportionate to the accumulation of the key timing deviation.

* * * * *